Nov. 20, 1956  R. N. STRAEHL  2,771,593
ERROR POSITION INDICATOR FOR TARGET MANIFESTATION DEVICE
Filed Jan. 20, 1954  4 Sheets-Sheet 1

*INVENTOR.*
*ROBERT N. STRAEHL*
BY
Dewey J. Cunningham
ATTORNEY

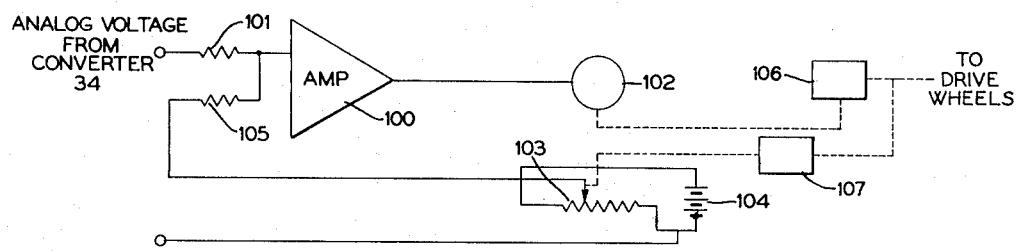
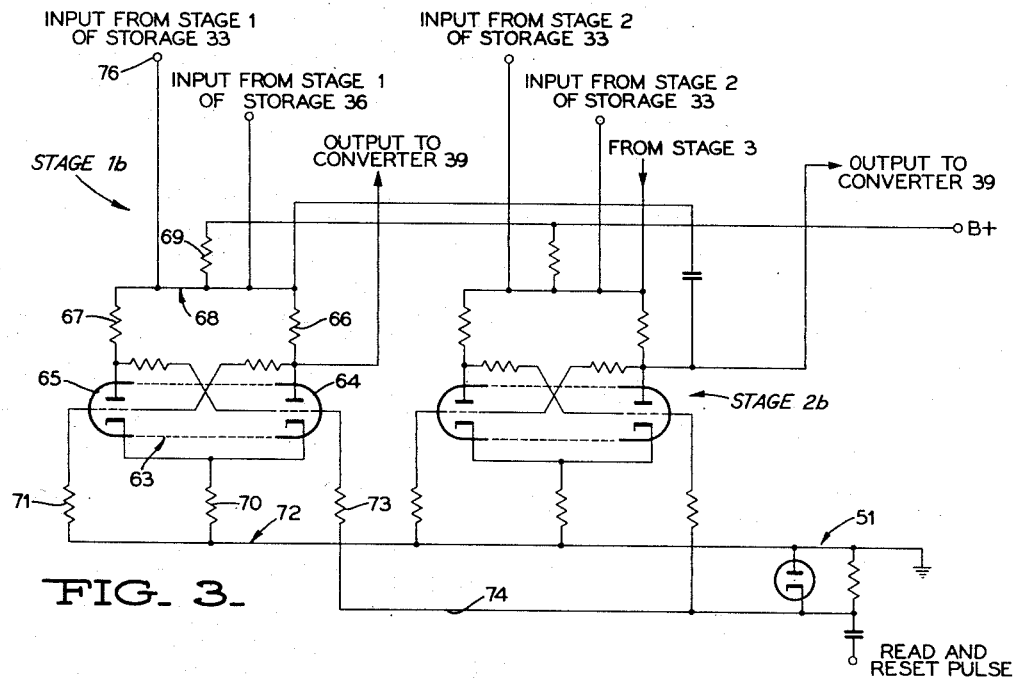
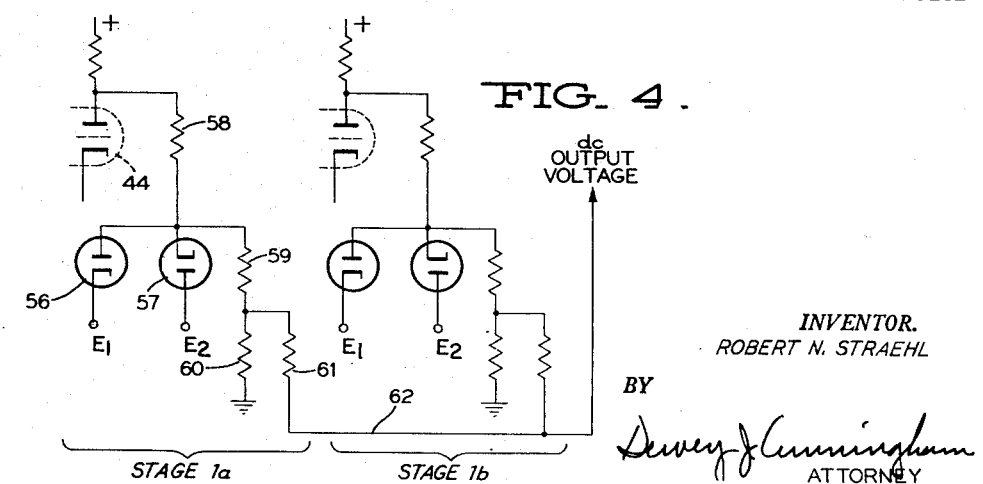

Nov. 20, 1956 R. N. STRAEHL 2,771,593
ERROR POSITION INDICATOR FOR TARGET MANIFESTATION DEVICE
Filed Jan. 20, 1954 4 Sheets-Sheet 3
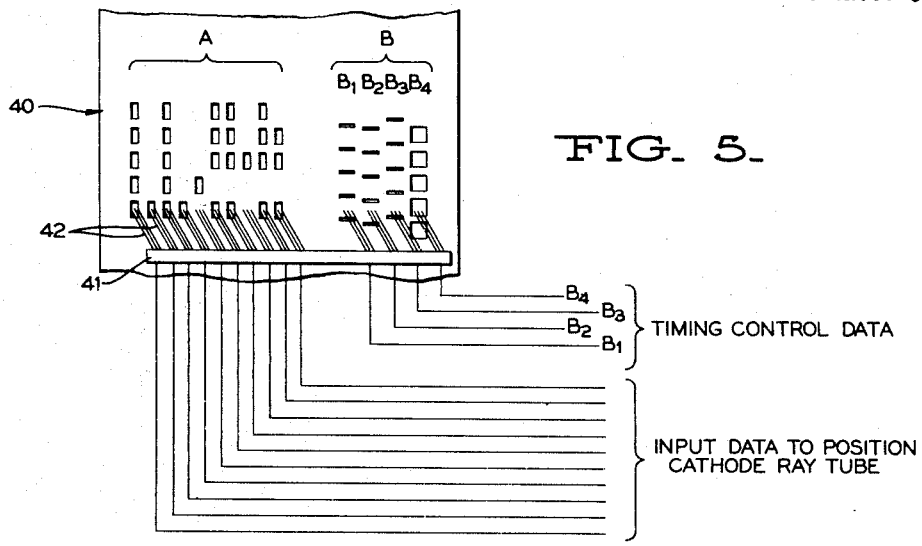
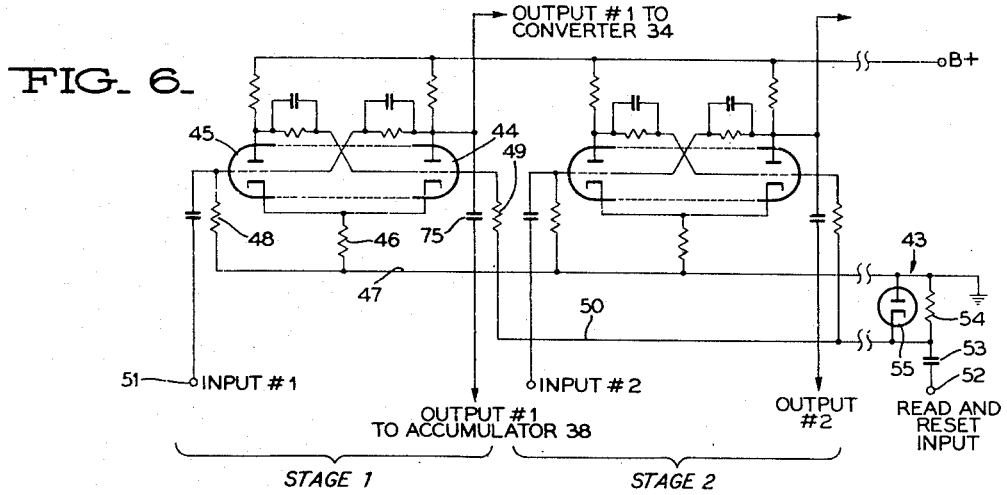
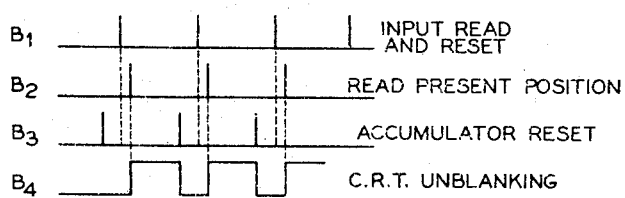
INVENTOR.
ROBERT N. STRAEHL
BY
Dewey J. Cunningham
ATTORNEY Nov. 20, 1956  R. N. STRAEHL  2,771,593
ERROR POSITION INDICATOR FOR TARGET MANIFESTATION DEVICE
Filed Jan. 20, 1954  4 Sheets-Sheet 4

INVENTOR.
ROBERT N. STRAEHL
BY
Dewey J. Cunningham
ATTORNEY

United States Patent Office 2,771,593
Patented Nov. 20, 1956

2,771,593

ERROR POSITION INDICATOR FOR TARGET MANIFESTATION DEVICE

Robert N. Straehl, Binghamton, N. Y., assignor to International Business Machines Corporation, New York, N. Y., a corporation of New York Application January 20, 1954, Serial No. 405,071

7 Claims. (Cl. 340—24)

This invention relates to a positioning device for a manifestation and more particularly to a positioning device which is controlled by furnished data.

An object of the invention is to provide an improved positioning device.

Another object of this invention is to furnish an improved combination mechanical and electrical device for positioning a manifestation which may be used as a target.

Still another object of the present invention is to provide an improved means for positioning a target manifestation in accordance with furnished position data wherein the visual indication moves from one position to another, as directed, without lag.

A further object of the invention is to provide an improved visual indication positioning device which has almost instantaneous response to new position input data coupled with a high degree of accuracy.

A still further object of the instant invention is to provide an improved means for positioning a visual manifestation in accordance with position input data without "hunting" by said manifestation.

Another object of this invention is to furnish improved means for positioning a target manifestation in a predetermined area while the position of said predetermined area is being positioned in a larger area.

Another object of the invention is to provide improved means for positioning a target manifestation almost instantaneously in a predetermined area in accordance with input position data while the position of said predetermined area is being positioned in a larger area at a much slower rate.

Another object of the invention is to provide an improved target manifestation positioning means as described immediately above wherein the target manifestation maintains its relative position in the larger area and changes its position in the predetermined area while the predetermined area is moving to its new position.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a schematic diagram of an electro-mechanical servo which may be used in the present invention.

Fig. 3 is a schematic diagram of a portion of an accumulator which may be used in this invention;

Fig. 4 is a schematic diagram of a portion of a digital-to-analog voltage converter which may be used in the instant invention;

Fig. 5 is a schematic diagram of a tape storage and reader unit which may be used in the invention;

Fig. 6 is a schematic diagram of a portion of a storage unit which may be used in the present invention;

Fig. 7 is a timing diagram of the timing control pulses obtained from the tape storage and reader shown in Fig. 5;

Similar reference characters represent similar parts throughout the several views.

Figure 1:
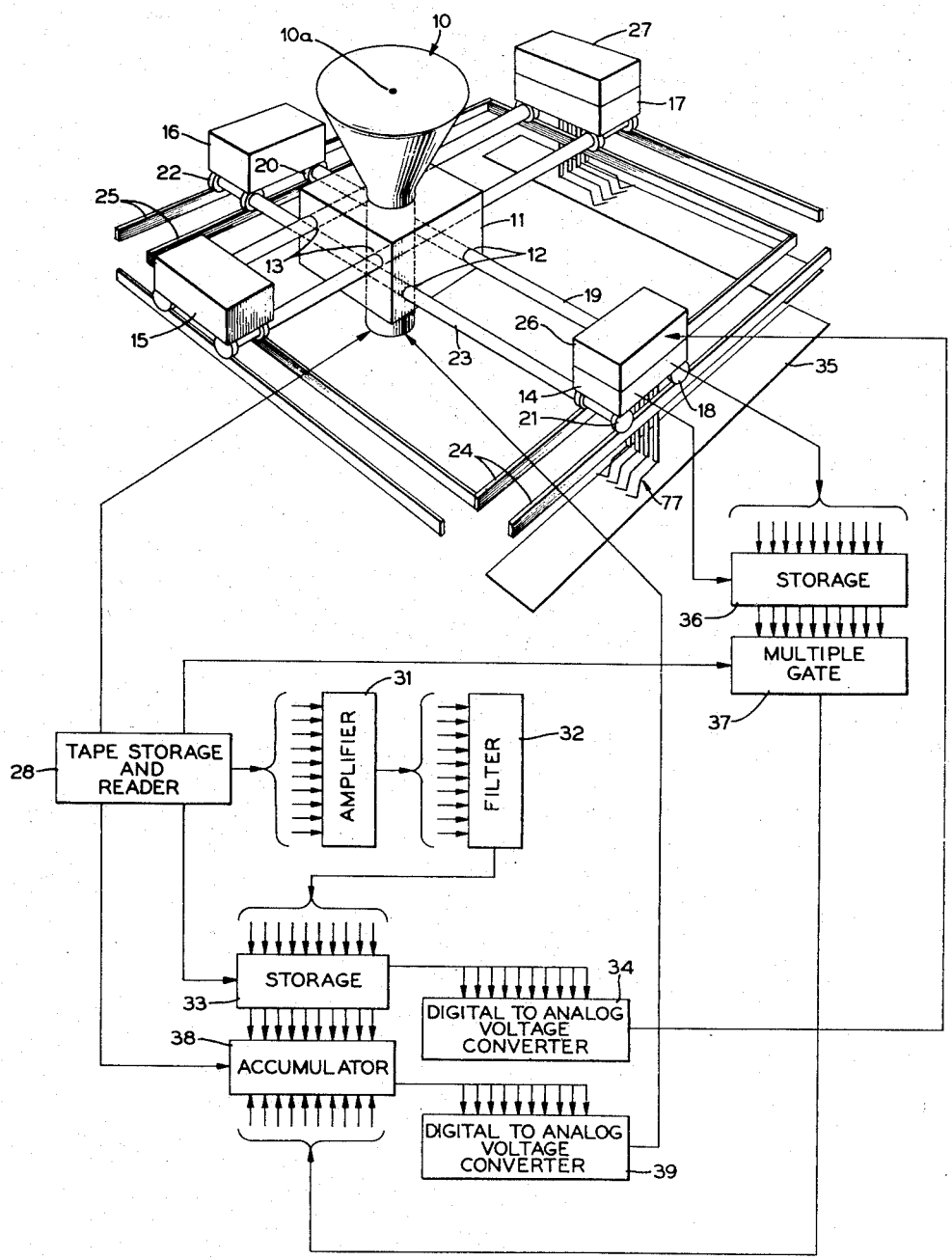
Fig. 1 is a mechanical and electrical schematic diagram of the present invention, parts of the mechanical structure being shown in perspective while the electrical circuit is shown in block form.

In various types of computer apparatus it is desirable to evaluate the accuracy thereof under laboratory conditions as distinguished from actual conditions. Under laboratory conditions a determination can be made with respect to the accuracy of design of the various components used. For example, in bombing computer apparatus for aircraft it is desirable to determine whether the computer will track a target. Under actual conditions there are many errors which may be introduced into the system in the form of external input data, for example, altitude and wind velocity and direction. The internal design of the computer may also be in error. Either type of error may cause the computer to lose track of the target. It is difficult to make a determination as to which type of error is causing the computer to drift from the target.

In order to test the computer for internal design errors it is desirable to operate the computer under laboratory conditions, thus eliminating the possibility of erroneous external input data. The present invention affords such a test.

While the computer is operating in an aircraft the computer moves with the aircraft and the target is stationary. Under laboratory conditions it is proposed to keep the computer stationary and move the target. In the instant case the computer may be provided with a periscope which is driven by the computer to maintain track of the target. The target is caused to move through a programmed path which will test the ability of the computer to track the target. The arrangement is such that the target is a manifestation in the form of a "spot" on a cathode ray tube which is mounted on a translatable support for traversing an area of predetermined size. That is, means are provided to move the support longitudinally of the area and means are provided to move the support transversely of the area. Record means such as a perforated tape may be used to transmit signals to the means for causing support movement. The last-named means may take the form of a servomechanism which positions the support from one location to another by means of a drive motor. As the support is moved from one position to another the cathode ray tube is moved accordingly. The "spot" on the cathode ray tube which is used as the target is adapted to be positioned in the center of the tube when the support is at its correct position. The speed of the servomechanism is limited by the maximum slewing rate of the drive motor, thereby causing an error which is equal to the distance between the position where the cathode ray tube should be as directed by the perforated tape and its actual position. While in motion the tube will in general lag behind the desired position, owing to the velocity constant of the servomechanism. If acceleration is present, the tube will always be in error due to the power limitations on the motor in overcoming the inertia of the support and its associated moving elements thereof. Thus, the target "spot" will also be in error by the same amount if it remains in the center of the tube.

These limitations are overcome in the present invention by measuring the error and supplying a signal to the cathode ray tube which almost instantaneously moves the "spot" thereon to the proper location. That is, the "spot" is deflected from its normal position in the center of the tube a distance equal to the distance by which the position of the support is in error. This then places the "spot" in a position, relative to an observer, called for by the tape stored signals, even though the position of the support is in error.

Referring to the drawings, Fig. 1 shows schematically the translating means for the cathode ray tube and shows in block form the control means for moving said tube and the "spot" thereon. A cathode ray tube 10 is mounted on a support 11 and has a "spot" 10a normally positioned centrally thereof. The support is furnished with one pair of spaced apertures 12 and a second pair of spaced apertures 13 extending transversely of apertures 12. In order to move the cathode ray tube and its support over a predetermined area carriage means 14, 15, 16 and 17 are provided. Each carriage means, as shown, includes four wheels which are mounted in pairs. Carriage 14 has a pair of wheels 18 connected by a shaft 19 to a pair of wheels 20 on carriage 16. Pairs of wheels 21 and 22 on carriages 14 and 16, respectively, are connected by a shaft 23. Shafts 19 and 23 are journaled in apertures 12 in support 11. Wheels 18 and 21 are adapted to ride on a track comprising a pair of rails 24 while wheels 20 and 22 are adapted to ride on a track comprising a pair of rails 25.

An arrangement of wheels, shafts, and track means is provided for carriages 15 and 17 identical to that provided for carriages 14 and 16. A servomechanism, shown in block form and illustrated generally by reference numeral 26, is mounted on carriage 14 and is arranged so that the drive motor thereof is connected through appropriate gearing to wheels 18 and further through shaft 19 to wheels 20. Thus, it will be seen that carriages 14 and 16 are propelled along the tracks associated therewith. A servomechanism 27 is mounted on carriage 17 to move carriages 15 and 17 along their tracks in a similar manner. Therefore, the cathode ray tube may be positioned at any desired location within the area surrounded by the tracks.

The circuitry used to control servomechanism 26 is identical to that for controlling servomechanism 27 so that only the circuitry for servomechanism 26 will be shown and described in detail.

In general, the invention contemplates the use of a tape storage and reader unit 28 which supplies new position data in binary digital form through an amplifier 31 and a filter 32 to a storage unit 33. At an appropriate time a pulse is supplied from unit 28 to the storage unit which reads out the information therein to an accumulator 38 and also resets the storage unit. The storage unit also supplies output signals to a digital-to-analog converter 34. Converter 34 feeds an analog voltage proportional to the binary input data to servo 26 which causes the cathode ray tube to begin its movement to the new position along one axis. The present position of the cathode ray tube on this axis is supplied from a tape 35 to a storage unit 36 in complementary form. At an appropriate time a reset pulse is supplied to the storage unit from the tape. The information from the storage unit is fed through a multiple gate 37 under the control of a read pulse from tape storage and reader 28 to accumulator 38. In the accumulator the new position data from storage unit 33 is added to the complement of the present position data from storage unit 36, thus providing an error signal output to the digital-to-analog converter 39. The output from the converter is a voltage proportional to the binary error signal and is fed to one pair of deflection plates of the cathode ray tube. The cathode ray tube is provided with an unblanking signal from unit 28 so that the "spot" is turned on at a time when the accumulator has the error stored therein. The signal from the converter to the cathode ray tube causes the "spot" to move to the correct position along the axis aforementioned.

In greater detail, the cathode ray tube is moved in accordance with a program in tape storage and reader 28 which is illustrated in block form in Fig. 1 and shown in detail in Fig. 5. Referring to Fig. 5 it will be seen that the tape 40 is divided generally into sections A and B. Section A contains a plurality of columns in which perforations may be provided in a binary code. While a ten digit binary code is shown it will be obvious that any number of digits may be used. The information in section A is the new position input data for moving the cathode ray tube in a predetermined manner. Section B is also divided into a plurality of columns in which perforations are provided to supply timing pulses to the system. The perforations in these individual columns may be compared with the timing diagram shown in Fig. 7. Column $B_1$ provides pulses midway between the perforations in column A for resetting and reading storage unit 33. Column $B_2$ provides an output pulse just after the occurrence of the reset and read pulse from column $B_1$ which is fed to multiple gate 37 to read out the present position information from storage unit 36 and supply it to accumulator 38. Column $B_3$ supplies an output pulse to reset accumulator 38 just prior to the read-in thereto from storage units 33 and 36. Column $B_4$ supplies a pulse of longer duration to unblank the cathode ray tube, this pulse lasting from the present position read pulse in column $B_2$ to the accumulator reset pulse in column $B_3$.

Referring again to Fig. 5, the reader portion of tape storage and reader 28 comprises a stationary brush holder 41 which is provided with a plurality of brushes 42, there being one brush for each digit of the binary number in section A and one brush for each individual column in section B. The means for obtaining voltage signals from the tape storage and reader unit have not been shown in detail. However, conventional means may be provided. For example, the read brushes may be biased to a predetermined potential through resistor means and the backing strip for the tape may be grounded. Therefore, when a brush engages the backing strip, the potential thereof is dropped to ground. The brush potential may then be supplied to the storage unit. The brushes which read the timing control data may be RC coupled to the appropriate devices.

The new position input data from column A of the tape is fed through amplifier 31 and filter 32 to storage unit 33. Reference is made to Fig. 6 which shows the details of a sample portion of unit 33. This storage unit comprises a series of bi-stable flip-flop stages, there being one stage for each digit of the binary number which is in the input data. Only stages 1 and 2 have been shown, it being understood that the remaining stages are identical. Stage 1 will be described in detail. It is shown to include a duo-triode having a normally conducting right side 44 and a normally non-conducting left side 45. The usual B+ power supply is applied through plate resistors to the plate of each side. The cathodes are connected through a common resistor 46 to ground potential through a line 47 which is common to the cathode resistors of the remaining stages. The left side 45 of the duo-triode has its grid resistor 48 also tied to the common ground line 47. The grid resistor 49 for the right side 44 of the duo-triode is tied to a line 50 which is common to the grid resistor for the right side of all stages.

The input to stage 1, by way of example, may be the highest order digit of the binary input. This input is applied to terminal 51 which connects to the grid of the left side 45. If a pulse is not present in the input, that is, if the highest order digit is a "zero," then side 44 continues to conduct and the condition of the flip-flop remains unchanged. If there is a pulse present, that is, if the highest order digit is a "one," side 45 begins to conduct and side 44 cuts off. The output signal to converter 34 is picked off the plate of the right side 44. The output signal to accumulator 38 is also picked off the plate of the right side 44 and supplied through a capacitor 75.

The means used to read and reset the storage unit is illustrated generally by reference character 43. The read and reset input pulse from column B₁ of the tape is applied to terminal 52 which connects through a differentiating circuit, comprising capacitor 53 and resistor 54, to ground. Resistor 54 is connected across diode 55 so that the plate of the diode is connected to line 47 and the cathode is connected to line 50. When the positive read and reset pulse is applied to terminal 52 line 50 goes positive which causes all tubes which have been upset or flipped to return to a state where the right side is conducting. If the tube was not flipped, the application of a positive pulse as aforementioned has no effect on the tube. Negative pulses, normally obtained by the RC differentiating network, are prevented from reaching line 50 by diode 55.

As is well known, when a flip-flop changes state the plate potential of each side thereof changes. When the left side 45 begins to conduct the plate voltage of the right side goes up, sending a positive pulse through capacitor 75 to one stage of accumulator 38. When the left side cuts off, a negative pulse is sent to the accumulator. The design of the accumulator is such that it is inherently receptive to negative going signals only.

The output to the digital-to-analog converter 34 is taken from the plate of the right side 44 of the duo-triode. This voltage is substantially square wave and of varying frequency depending on how often the state of the tube is upset.

A sample portion of converter 34 is shown in Fig. 4. The converter comprises the same number of stages as the storage unit 33. Only two stages are shown in the drawing, it being understood that the remaining stages are identical. The stages shown are numbered 1a and 2a to show the relationship to stages 1 and 2 in the storage unit. That is, the output from the right side of stages 1 and 2 of the storage unit is fed to stages 1a and 2a, respectively, of the converter. Stage 1a will be described in detail. The input from stage 1 of the storage unit, taken from the plate of the right side 44 of the duo-triode, is applied to the plate of a diode 56 and the cathode of a diode 57 through a current limiting resistor 58. The cathode of diode 56 is biased with a voltage E₁ and the plate of diode 57 is biased with a voltage E₂. In this manner, the voltages E₁ and E₂ may be arranged to limit the input voltage to a predetermined variation. For example, the input voltage from the storage unit may vary between 50 volts and 150 volts. By use of proper values of E₁ and E₂ the diodes may limit the voltage output therefrom to swing between 75 volts and 125 volts. Thus, if the input voltage has minor variations in magnitude, the output from the diodes will remain the same. The output from the diodes is taken from the plate of diode 56 and the cathode of diode 57 and applied to a voltage divider network comprising resistors 59 and 60. Resistors 59 and 60 are of such a value that the output voltage which is picked off therebetween is proportional to the binary value of the digit with which it is associated. In the remaining stages the resistors are scaled down accordingly. That is, the voltage output from a higher order stage is twice the output from the next lower order stage. The output from between resistors 59 and 60 is applied to a common conductor 62 through a summing resistor 61. Therefore, the voltage potential on conductor 62, as applied from all stages of the converter, is proportional to the sum of all the digit-valued voltages.

The analog output potential from converter 34 is supplied to a conventional servo 26, shown in block form in Fig. 1 and in detail in Fig. 2. Referring to the latter figure, the input is applied to an amplifier 100 through a summing resistor 101. The amplifier output is fed to a motor 102 which is driven thereby. Motor 102 is shaft connected through a gear box 106 to the carriage drive wheels for moving the cathode ray tube. The drive wheels are shaft connected through gear box 107 to the wiper arm of a potentiometer 103. A battery 104 is connected to apply a potential to potentiometer 103. The wiper arm picks off a potential as directed by motor 102. This wiper arm potential is supplied through summing resistor 105 to the input of amplifier 103. The operation is such that the analog input voltage causes the motor to drive the wiper arm to a particular position. As the wiper arm approaches that position it supplies a potential to the amplifier which degenerates the analog input. Thus, the amplifier receives a signal proportional to the displacement of the carriage in its present position from the position it is told to go to by the new position data from the tape. This signal is known as the error signal.

A sample portion of accumulator 38 is shown in Fig. 3, the highest order stage being illustrated as stage 1b and the next succeeding stage as 2b. The remaining lower order stages are identical. Each stage of the accumulator is in the form of a bi-stable flip-flop. Coupling of the stages is from the right side of the lowest order flip-flop to the common input of the next higher order flip-flop. Stage 1b will be described in detail. A duo-triode 63 is provided and includes a normally conducting right side 64 and a normally cut off left side 65. Right side 64 has a plate resistor 66 while left side 65 has a plate resistor 67. Each plate resistor connects to a common input line 68 which connects through a resistor 69 to a B+ power supply. A common cathode resistor 70 and the grid resistor 71 for the left side 65 connect to a common ground line 72. The grid resistor 73 for the right side 64 connects to a common conductor 74. Reset means 51, similar to that associated with storage unit 33, is provided for the accumulator. When the reset pulse is supplied from column B₄ the right side of all flip-flop stages conducts.

The input pulse from stage 1 of storage unit 33 is applied through capacitor 75 and terminal 76 to the common input line 68. The construction of the flip-flop stage is such that it is inherently receptive to negative pulses only. Therefore, an input is only received when the right side of stage 1 of the storage unit begins conducting after it has been cut off. This is, in effect, similar to a carry pulse. The present position input from storage unit 36 also is applied to common input 68. However, the present position information is in complement form. Therefore, by adding the new position information to the complement of the present position of the cathode ray tube, an error signal is obtained. This error signal is a function of the difference between the present position and the new position data. A carry pulse is obtained in the accumulator when a stage is returned to a normal state. The carry pulse is supplied from the right side of a lower order stage to the common input of a higher order stage and is negative in character. It is true that positive pulses are sent through the same line when a flip-flop stage is upset, but, due to the design of the flip-flop, such a pulse does not affect it.

The output from the plate of the right side of all flip-flop stages is applied to the digital-to-analog voltage converter 39, which is identical to converter 34 previously described. The output voltage from converter 39 is applied to one pair of the cathode ray tube deflection plates, causing the spot to be instantly deflected to the position the center of the cathode ray tube would occupy if it were positioned in the proper location in accordance with the new position data.

The manner of obtaining the present position of the cathode ray tube will now be described in detail. Tape 35 is arranged in such a manner that a number of brushes 77 mounted on carriage 14 can engage the perforations therein. The tape is coded in binary form. Tape 35 is stationary and contains the same number of digits as there are in column A of the new position input tape. In addition, a reset timing pulse perforation is furnished in the tape to reset storage unit 36.

Figure 8:
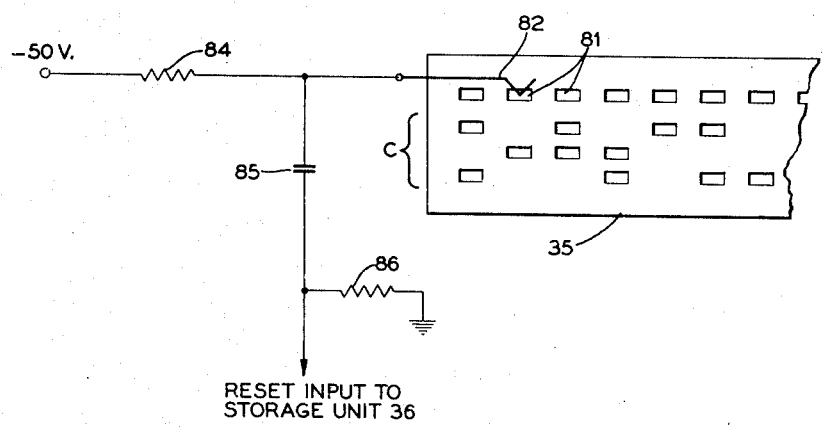
Fig. 8 is a schematic diagram of a circuit for resetting the present position storage unit.

Referring to Fig. 8, a portion of tape 35 is shown and includes present position data by way of perforations in section C and reset information by way of perforations 81. A brush 82 is arranged to be received by perforations 81 as it passes thereover. When the brush enters a perforation it engages a grounded backing strip. Brush 82 is connected through a resistor 84 to a negative potential, which, by way of example, is shown to be −50 volts. The brush is also connected through a capacitor 85 and a resistor 86 to ground potential. The output is taken between capacitor 85 and resistor 86 and fed as the reset input to storage unit 36. The operation of this circuit will now be explained. When brush 82 is on the tape, i. e., not in a perforation, the potential on the brush side of the capacitor is at −50 volts. When the brush enters one of perforations 81, it immediately rises to ground potential. This raises the potential of the aforementioned side of the capacitor to ground potential, sending a positive reset pulse to the storage unit. This pulse acts on storage unit 36 in the same manner as the reset pulse did when supplied to storage unit 33. Since the reset pulse is supplied just as new data is about to be entered into the storage unit, due to the present position reading brushes 77 entering a new series of perforations, the old position information is not destroyed until it is assured that new information is available. Therefore, the same information is left in storage unit 36 even though the reading brushes may leave the perforations and come to rest between perforations.

Figure 9:
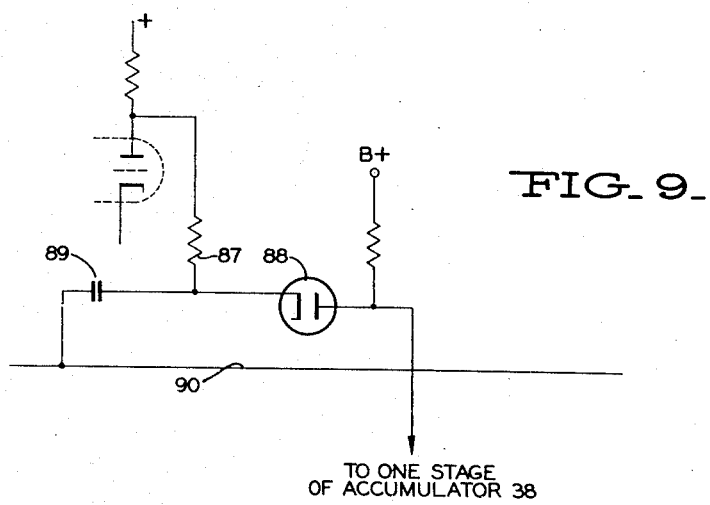
Fig. 9 is a schematic diagram of a portion of a multiple gate which may be used to read out the information from the present position storage unit.

In Fig. 9 a sample portion of the multiple gate 37 is shown. The plate of the right side of each stage of present position storage unit 36 is connected through a resistor 87 to the cathode of a diode 88 and one side of a capacitor 89, the other side of the capacitor being connected to a read bus 90. The plate of diode 88 is connected through a resistor 91 to a B+ potential. If the right side of the particular stage of the present position storage unit under consideration is conducting the plate potential will be down. When a negative read pulse is supplied from tape storage and reader unit 28 to the read bus 90 the cathode potential of diode 88 drops. The arrangement is such that this read pulse will cause the diode to conduct only if the plate of the right side of the stage of the storage unit under consideration is down, i. e., if the right side is conducting. Thus, a "0" in the storage unit is read out through the multiple gate as a "1," thus providing the binary complement. In order that a true binary two's complement be provided it is necessary to offset the present position binary number by −1. This is a well-known principle in converting from a binary number to the complement thereof.

From the above, it will be seen that accumulator 38 receives the new position data from storage unit 33 and the complement of the present position data through the multiple gate from storage unit 36. This provides an error signal, which, when fed through converter 39 to one pair of the deflection plates of the cathode ray tube, causes the "spot" on the tube to be moved to a position where the target should be.

To prevent overrunning the correct position and causing the accumulator to put out a negative error signal, an arrangement is provided whereby only positive error signals will be obtained. To do this, it is necessary to bias the "spot" on the cathode ray tube away from the center of the tube and this is considered as its normal position corresponding to zero error signals. An error signal causes the "spot" to be deflected toward the middle of the tube. At the same time, the present position tape is offset a corresponding distance. Thus, when servo 26 comes to rest, the error signal from converter 39 will become constant and will offset the initial bias and bring the "spot" to the middle of the tube. This "spot" position then becomes the true location of the target. If the servo overruns, the aforementioned constant error will merely be reduced by a certain amount but will not go below zero.

The operation of the device will now be described in detail. Starting with the condition when the cathode ray tube is at rest in a predetermined position, the "spot" thereon will be at the center of the tube. The "spot" is deflected to the center by the constant "error" signal out of accumulator 38. This "error" signal is proportional to the difference between the cathode ray tube position, as directed by the tape in unit 28, and the present position reading from tape 35 which is traversed by the brushes on carriage 14. It will be remembered that tape 35 is offset a predetermined amount in order that the "error" signal will always be positive. The amount of the "error" signal will be a prescribed constant value when the cathode ray tube is in its rest position, this value being the potential which will deflect the "spot" to the center of the tube to offset the tube bias which normally deflects the "spot" to one side. Since tape 40 in unit 28 moves continuously, a new position will be read from section A thereof. This information is fed to storage unit 33 and sets up the flip-flop stages thereof with the information in the tape. That is, if a perforation is found in a certain column of section A, a stage in the storage unit related to that column will be upset. Thus, a "1" in read into this stage. If no perforation is found in the column, a "0" is left remaining in the stage. As the stages are being conditioned, an output is sent from the plate of the right side thereof to corresponding stages of the digital-to-analog voltage converter 34. The analog output voltage from the converter is supplied to servo 26 which begins driving the cathode ray tube along one axis toward the new position.

Between perforations on tape 40 a read and reset pulse is applied from column $B_1$ of the tape to the storage unit. This pulse resets all stages of the storage unit and at the same time reads the information therein to accumulator 38. The information is fed from the storage unit stages to corresponding stages of the accumulator. Here again, if a "1" has been stored in unit 33, a "1" is placed in the corresponding stage of the accumulator. Thus, the binary number from tape 40 is placed in the accumulator.

While the cathode ray tube has just begun to move toward its new position, it can almost be considered to be in its last rest position. This information is read from tape 35 and stored in unit 36. Shortly after the read and reset pulse from column $B_1$ is applied to storage unit 33, a read present position pulse is applied from column $B_2$ to multiple gate 37. This reads the complement of the binary number on tape 35 into accumulator 38. This immediately increases the "error" signal from the accumulator and causes the "spot" to jump almost instantaneously to a position on the cathode ray tube which is the new target position called for by tape 40. This occurs when the cathode ray tube is unblanked by the signal from column $B_4$ in tape 40. Unblanking lasts from the read present position pulse to the accumulator reset pulse.

Gradually, servo 26 moves the cathode ray tube to the new position. As this occurs, the "error" signal from accumulator 38 decreases, causing the "spot" to approach the center of the tube. It is not unusual for the servo to overshoot its new position and then return thereto. During the overshoot time, the "error" signal from the accumulator decreases below what it was at the instant the cathode ray tube was at its new position. Thus, the "spot" passes through the center of the tube and then returns to the center as the cathode ray tube recovers from its overshoot.

Thus, the "spot" on the cathode ray tube always retains a position in the area surrounded by the tracks which is a true target position in accordance with the information on tape 40. It does not lag this position as would a stationary target mounted for translation on support 11. When a system similar to that used for controlling servo 26 is provided for controlling servo 27, two dimension movement of the cathode ray tube is provided, i. e., along two perpendicular axes.

With the type of target positioning device described in the present position it is possible to test a bombing computer system which is in a stationary position. The periscope of the system can follow the moving "spot," thus providing the same relative movement which exists when the computer is mounted in an aircraft and is tracking a stationary target.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for positioning a manifestation, means for providing said manifestation, means mounting the last-named means for translation over an area, motive means operatively associated with said mounting means for causing translation thereof, means for receiving position data to control said motive means, means for providing an output signal which is a function of the error in the present position of said mounting means in relation to the position data input, and means for moving said manifestation relative to said mounting means under the control of said output signal.

2. In a device for positioning a target manifestation, a cathode ray tube having a target manifestation on the face thereof, means mounting said cathode ray tube for translation over an area, power means operatively connected to said mounting means for causing translation thereof, means for receiving input position data to control said power means, means for providing an error signal which is a function of the relationship between the present position of said mounting means and the position data input, and means for moving said target manifestation relative to said mounting means under the control of said error signal.

3. In a device for positioning a target manifestation, a cathode ray tube having a target manifestation thereon, means mounting the cathode ray tube for translation over an area, motive means operatively connected to the mounting means for causing translation thereof, means for providing data representing a position in said area at which it is desired the target manifestation be located, said motive means being connected to receive said data and move said cathode ray tube in accordance therewith, means for obtaining position data representing a present position of the cathode ray tube, means for receiving said present position data and the position data input and providing an output signal in accordance with the error therebetween, and means for moving said target manifestation over the face of the cathode ray tube under the control of said output signal.

4. In a device for positioning a target manifestation, means for providing a target manifestation which is movable in a first-mentioned area, means mounting the last-named means for translation over a second-mentioned area, motive means operatively associated with said mounting means for causing translation thereof, control means, said control means being connected to cause the movement of said target manifestation in said first-mentioned area, position data input means providing a position signal corresponding to a position in said second-mentioned area at which said target manifestation should be, means for reading said position data input means and supplying a signal corresponding thereto to said motive means to position said mounting means in said second-mentioned area, means for providing a position signal corresponding to the present position of said mounting means, accumulator means connected to receive said input position signal and said present position signal and provide an output signal which is a function of the relationship therebetween, said output signal being connected to said control means to position said target manifestation in said first-mentioned area so that its position in said second-mentioned area is in accordance with the input position signal from said position data input means.

5. In a device for positioning a target manifestation, means for providing a target manifestation which is movable in a first-mentioned area, control means, said control means causing movement of said target manifestation over said first-mentioned area, means mounting the first-named means for translation over a second-mentioned area, motive means operatively associated with the mounting means for causing translation thereof, means for receiving position data to control said motive means, means for providing an output signal which is a function of the difference between the present position of said mounting means and the position data input, said output signal being supplied to said control means to position said target manifestation in said first-mentioned area.

6. In a device for positioning a target manifestation, means providing a target manifestation, means mounting the last-named means for translation over an area, power means operatively connected to said mounting means for causing translation thereof, means for providing position data which indicates a position in said area at which it is desired said target manifestation be located, storage means connected to receive the position data from said last-named means, said motive means being connected to receive the position data in said storage means and be controlled thereby, accumulator means connected to receive the position data in said storage means, means for obtaining a present position signal representing the present position of said mounting means, means for supplying said present position signal to said accumulator means, said accumulator means providing an output signal proportional to the relationship between said position data and said present position signal, and means connecting the means for providing the target manifestation to receive said output signal so that said target manifestation is controlled thereby.

7. In a device for positioning a target manifestation, cathode ray tube means having a target manifestation on the face thereof, means mounting said cathode ray tube means for translation over a predetermined area, servo means operatively connected to said mounting means for causing translation thereof, means for supplying position signals in digital form indicative of positions in said area, storage means for receiving said position signals, means connected to said storage means for converting said position signals from digital form to an analog voltage proportional thereto, said servo means being connected to receive said analog voltage and move said cathode ray tube to the position in said area represented thereby, means providing a present position signal in digital form representing the present position of said cathode ray tube, control means for causing movement of said target manifestation over the face of said cathode ray tube, said control means being connected to receive the position data input signal from said storage means and said present position signal and provide an analog voltage for moving said target manifestation to the position in said area represented by said position data input.

References Cited in the file of this patent

UNITED STATES PATENTS

| | | |
|---|---|---|
| 1,551,393 | Hewlett, et al. | Aug. 25, 1925 |
| 1,782,294 | Florisson | Nov. 18, 1930 |
| 2,027,393 | McCreary | Jan. 14, 1936 |
| 2,413,300 | Dunn, et al. | Dec. 31, 1946 |
| 2,520,924 | Fraser | Sept. 5, 1950 |
| 2,604,529 | Duggar | July 22, 1952 |
| 2,679,033 | Hartman | May 18, 1954 |
| 2,692,377 | Brettell, Jr. | Oct. 19, 1954 |